US006470096B2

(12) United States Patent
Davies et al.

(10) Patent No.: US 6,470,096 B2
(45) Date of Patent: *Oct. 22, 2002

(54) METHOD FOR LOCATING USER INTERFACE TAGS IN A DOCUMENT PROCESSING SYSTEM

(75) Inventors: Daniel Davies, Palo Alto, CA (US); Julia A. Craig, Sunnyvale, CA (US)

(73) Assignee: Xerox Corporation, Stamford, CT (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/191,969

(22) Filed: Nov. 13, 1998

(65) Prior Publication Data
US 2002/0085759 A1 Jul. 4, 2002

(51) Int. Cl.[7] .................................................. G06K 9/46
(52) U.S. Cl. ................... 382/203; 235/462.16
(58) Field of Search ............................... 382/203, 204, 382/205, 206, 207, 208, 209, 219, 220; 235/462.27, 462.16; 707/531, 540

(56) References Cited

U.S. PATENT DOCUMENTS

| | | | |
|---|---|---|---|
| 5,065,437 A | 11/1991 | Bloomberg | 382/9 |
| 5,084,769 A | 1/1992 | Miura | 358/403 |
| 5,131,049 A | 7/1992 | Bloomberg et al. | 382/9 |
| 5,202,933 A | 4/1993 | Bloomberg | 382/9 |
| 5,449,895 A | 9/1995 | Hecht et al. | 235/494 |
| 5,504,822 A * | 4/1996 | Holt | 382/218 |
| 5,548,700 A * | 8/1996 | Bagley et al. | 395/144 |
| 5,591,956 A * | 1/1997 | Longacre, Jr. et al. | 235/494 |
| 5,666,214 A | 9/1997 | MacKinlay et al. | 358/403 |
| 5,811,776 A * | 9/1998 | Liu | 235/462 |

FOREIGN PATENT DOCUMENTS

| | | |
|---|---|---|
| EP | 0 469 864 A2 | 2/1992 |
| EP | 0 483 936 A2 | 5/1992 |
| FR | 2393484 | 12/1978 |
| JP | 05284264 | 10/1993 |

* cited by examiner

Primary Examiner—Andrew W. Johns
Assistant Examiner—Seyed Azarian

(57) ABSTRACT

A method for locating a substantially rectangular pattern, in any orientation, in a digitized image used in a document processing system operates by identifying all connected components within the image, discarding those that do not meet certain size criteria, and on the remaining connected components identifying eight compass-position extreme points, four of which may represent the corners of the rectangular pattern. The relationships among the extreme points are then analyzed to determine whether an expected diagonal length, expected height, and expected width of the pattern are all present within a selected tolerance.

20 Claims, 10 Drawing Sheets

METHOD FOR LOCATING USER INTERFACE TAGS IN A DOCUMENT PROCESSING SYSTEM

FIELD OF THE INVENTION

The invention relates to a pattern-matching methods and, more particularly, to an image processing scheme adapted to locate and identify a substantially rectangular pattern, in any orientation, within a digitized image.

BACKGROUND OF THE INVENTION

Many people are most comfortable dealing with documents in hardcopy format. In general, hardcopy documents are easier to read, handle, and store than documents kept in the digital domain. No special expertise or computer hardware is needed.

However, in general, it is far easier to manipulate documents in the digital domain. Text can be indexed, searched upon, reformatted, extracted, and otherwise changed. Stored documents can be easily duplicated, without loss of quality, and transmitted from person to person (for example, via e-mail). And significantly, all of this can be accomplished without using paper. Moreover, digital copiers and scanners are becoming far more prevalent in both office and home settings.

On the other hand, handling documents in the digital domain typically requires access to a computer system or network. If the user of the computer system does not have a baseline level of expertise or competence in using the system, then productivity can suffer. This is a serious impediment to the implementation of a "paperless office," in which digital documents are the prevailing document type.

Accordingly, there is a need to be able to effectively manage documents in the digital domain, as well as to ease the transition from hardcopy documents to digital documents.

Previous attempts to facilitate handling digital documents have often used traditional user-interface paradigms. For example, when a hardcopy document is to be scanned and entered into a document repository, commands to that effect are first entered into a computer terminal or scanning device, which then performs the desired service with the document. A similar sequence of steps is performed when the hardcopy is to be scanned and faxed, scanned and e-mailed, scanned and recognized (via optical character recognition software), or any of numerous other possibilities. Although the entry of commands can be facilitated via user-friendly software or self-explanatory commands, these extra steps are still tedious and may still require a certain level of expertise. Moreover, the sequence of commands entered may be lost once the operation has been performed, and there is a potential for error even with experienced users.

Another possibility is to employ a cover sheet that includes a form for specifying commands. The cover sheet is filled out as the user desires (either by hand-writing commands or by marking check-boxes, for example), and the scanner interprets the commands on the cover sheet and processes the following document accordingly. This, too, can be tedious and relatively inefficient, as it requires a special-purpose cover sheet to be used for each job. It can be inconvenient to maintain a supply of the proper cover sheets.

Various one- and two-dimensional data codes are known and available to be used to store digital data on hardcopy documents. For example, various types of barcodes (for example, the familiar UPC symbol used as a retail product code) are very well known and are robustly decodable. Other examples of linear barcodes are known as Code 39, Code 128, Interleaved 2 of 5, and Postnet. Two-dimensional codes, such as the PDF417 code and the UPS MaxiCode used by the United Parcel Service to track packages, for example, are becoming more and more widespread.

Self-clocking glyph codes, such as Xerox DataGlyphs, are attractive for embedding machine-readable digital information in images of various types, including ordinary hardcopy documents. These codes have substantial tolerance to image distortion and noise because the digital information they encode is embedded in and fully defined by explicit machine-readable marks (i.e., "glyphs," a term used herein which is not intended to be limited to Xerox DataGlyphs, but rather is intended to cover all machine-readable marks). These glyphs not only encode the information that is embedded in the code, but also define the sample clock that is employed to extract that information from the code, so they are responsible for the "self-clocking" property of the code as well as the distortion and noise tolerance.

Another known advantage of self-clocking glyph codes is that they ordinarily have an unobtrusive visual appearance. This is especially so of codes composed of glyphs that are written on a two-dimensional spatially periodic pattern of centers, such as a regular lattice-like pattern of centers, because the spatial periodicity of the glyphs causes the code to have a more-or-less uniformly textured appearance. For example, logically ordered single bit digital quanta typically are encoded by respective elongated slash-like glyphs which are written on a two-dimensional, spatially periodic pattern of centers in accordance with a predetermined spatial formatting rule, with the individual glyphs being tilted to the left or right of vertical by approximately +45° and −45° for encoding logical "0's" and "1's", respectively. The mutual orthogonality of the glyph encodings for the two logical states of these single bit digital quanta enhances the discriminability of the code sufficiently to enable the embedded information to be recovered, even when the code pattern is written on a sufficiently fine grain pattern of center to cause the code pattern to have a generally uniform grayscale appearance. It, however, is to be noted that it also has been shown that self-clocking glyph codes can be designed to encode multi-bit digital quanta in the glyphs.

Accordingly, it would be desirable to provide a solution that facilitates the use of documents in the digital domain and the transition of documents from hardcopy to digital formats. Such a solution should be simple, efficient, convenient, and require little or no expertise on the part of the user.

SUMMARY OF THE INVENTION

The present invention uses a scheme of encoded tags, such as adhesive stickers or labels, to serve as the primary user interface in a hardcopy document processing system. Such a system would permit a user to specify an action or a service to be performed and his own identity simply by applying a sticker to the document and placing it into a bin to be scanned.

The stickers are relatively small and unobtrusive, and in an embodiment of the invention use Xerox DataGlyphs to encode the user's identity, a desired service, and an optional argument for the service. The user maintains a supply of stickers corresponding to a particular service (e.g., "scan and send to my personal e-mail account"). When the user desires that service to be performed, he simply applies one of the appropriate stickers to the document.

A computer system performing the invention operates by first accepting information on the user's identity. This can be obtained, for example, by scanning and analyzing one of the user's business cards. This information is stored in a database and is given a unique user ID number. The user ID is combined with a desired service code, and the resulting data set is encoded into the desired printed data format. The system then prints a customized set of labels representing the user ID and service.

When the user then wishes to have the service specified by his stickers performed, he simply applies one of the stickers to a document and places it into a scanning queue. The document is scanned, the sticker is identified and decoded, re-associated with the user's information retrieved from the database, and the desired service is performed.

As will be recognized, this system can be adapted to perform numerous services and actions, including but not limited to simply scanning and storing the document in a repository, faxing the document, converting the document into a standard electronic format (such as Microsoft Word format), and others.

Accordingly, the sticker-based user interface of the present invention is convenient and simple, as it does not require the user to enter commands on a computer system or fill out a cover sheet for every document to be processed. It is efficient, in that it is only necessary for the user to keep a supply of small stickers.

The invention facilitates the use of relatively small user interface tags by enabling a distinctive pattern, such as a substantially rectangular border, to be identified and located within an image. The method for accomplishing this is computationally efficient, allowing the pattern to be identified in any orientation and including minor distortions and variations in size brought about by a digitizing operation.

DETAILED DESCRIPTION OF THE INVENTION

The invention is described below, with reference to detailed illustrative embodiments. It will be apparent that the invention can be embodied in a wide variety of forms, some of which may be quite different from those of the disclosed embodiments. Consequently, the specific structural and functional details disclosed herein are merely representative and do not limit the scope of the invention.

Figure 1:
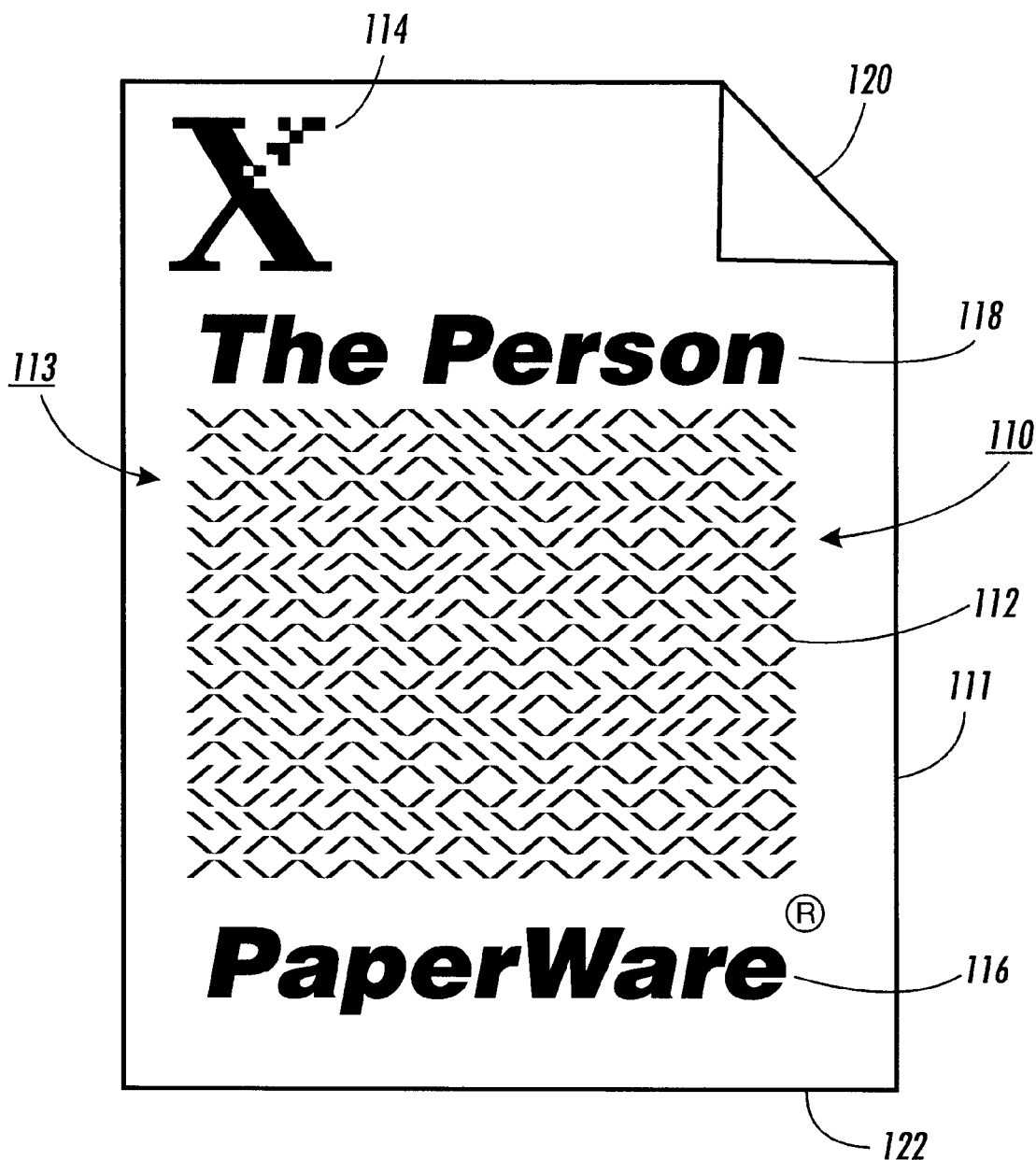
FIG. 1 is an exemplary glyph sticker in a configuration according to the invention.

FIG. 1 illustrates an exemplary glyph sticker pattern 110, which serves a paper user interface tag according to the invention. It should be noted that this pattern 110 is not to any particular scale; it is contemplated to be on the order of 1 inch (2.5 cm) or less in the vertical direction; it has been substantially enlarged here for clarity and to facilitate the identification of details.

Furthermore, while the user interface tag of the invention is illustrated in FIG. 1 as an adhesive sticker capable of being applied to documents, it should be observed that the pattern 110 may also be applied to forms, slip sheets, cover sheets, business cards, identification cards, name tags, and other objects capable of being associated with a document and further capable of bearing machine-readable information. For example, in an alternative embodiment of the invention, lapel pins bearing the pattern 110 may be associated with a document by scanning the lapel pin (e.g., with a hand-held laser scanner) at the same time the document is being scanned and processed.

As shown, the glyph sticker pattern 110 includes several important attributes. A substantially rectangular border 111 surrounds the remaining features, and is in turn surrounded by white space 113. A glyph field 112 contains a printed representation of digital data used to perform the goals of the invention; the structure and contents of the glyph field 112 will be discussed in further detail below. For now, it should be noted that the glyph field 112 of FIG. 1 is shown as using Xerox DataGlyphs. However, it will be observed that any recoverable printed representation of digital information, including but not limited to bar codes, one- and two-dimensional data patterns, and optically recognizable alpha-numeric characters can also be used in alternative embodiments of the invention to similar effect.

Other identifying elements may also be present within the glyph sticker pattern 110. For example, the Xerox "Digital X" 114 and the registered mark "PaperWare®" 116 are present and are used for aesthetic purposes and as trademarks. The phrase "The Person" 118 is also present; it is contemplated that this field may be replaced with an indication of the user's name or other information for visual identification. There is also a border portion 120 that is representative of a folded page. This border portion 120 may be present for aesthetic purposes only, or may be used by the invention to facilitate determination of the correct orientation of the glyph sticker pattern 110. This aspect of the invention will be discussed in further detail below.

Figure 2:
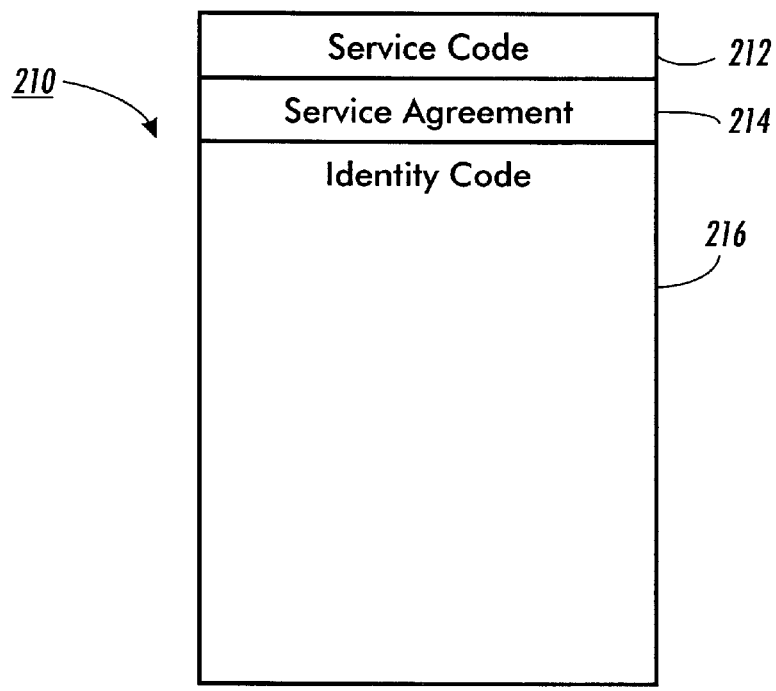
FIG. 2 is an exemplary block diagram illustrating a data structure represented by the glyph sticker of FIG. 1.

Referring now to FIG. 2, an exemplary data structure 210 embodied by the glyph field 112 is set forth as shown. The data structure 210 includes a service code 212, which in one embodiment of the invention is a single byte (eight binary bits). Accordingly, the service code 212 can represent up to 256 different possible actions, transformations, and services. Exemplary services may include, but would not be limited to, "scan to document repository," "scan and send via e-mail," "scan and fax," "scan and print copies," and so forth. An indicated service may, without limitation, include a plurality of actions (e.g., scan, then recognize characters, then e-mail the text), and may also involve transformation of the document from hardcopy to electronic form, and possibly back to hardcopy form. Moreover, one or more possible actions might involve the removal or alteration of the glyph sticker pattern 110 on the digitized image of the document, as its presence is no longer necessary (and may detract from the document's appearance) once it has been acted upon by the system and method of the invention.

A service argument 214 provides a coded argument to the service code 212. In an embodiment of the invention, the argument 214 is an additional byte (eight bits) of information. For example, certain services may require a numeric argument (e.g., "scan and print copies" followed by an argument of "10" will print ten copies). Other services may require a differently coded argument (e.g., "scan and fax" followed by an argument of "2" may represent a command to fax the document to the user's home fax number, as opposed to an office fax number or, perhaps, an alternate office fax number, both of which would have different argument numbers). Many other uses of the service argument 214 may also be envisioned without departing from the scope of the invention.

An identity code 216 comprises most of the rest of the data structure 210. In an embodiment of the invention, the identity code includes sixteen bytes of identity information (sufficient to encode a unique identification number for each member of nearly any conceivable population) and eight bytes of security information, the latter rendering the identity code essentially tamper-proof. The identity information is formed from the network address (either an Ethernet address or an IP address) of the machine issuing the identity code, a time stamp, and a sequence number. Although a number formed in this manner is not guaranteed to be unique under all circumstances (for example, if the database of sequence numbers is lost and the same time stamp is coincidentally used twice), it is quite robust and sufficiently unique for the purposes of the invention. It should also be noted that the identity code may be formed in any of numerous other ways, all of which would be acceptable for use with the present invention.

The data structure 210 also includes error-correction and synchronization information throughout the specified data fields in a manner well known in the art and not shown in FIG. 2.

Figure 3:
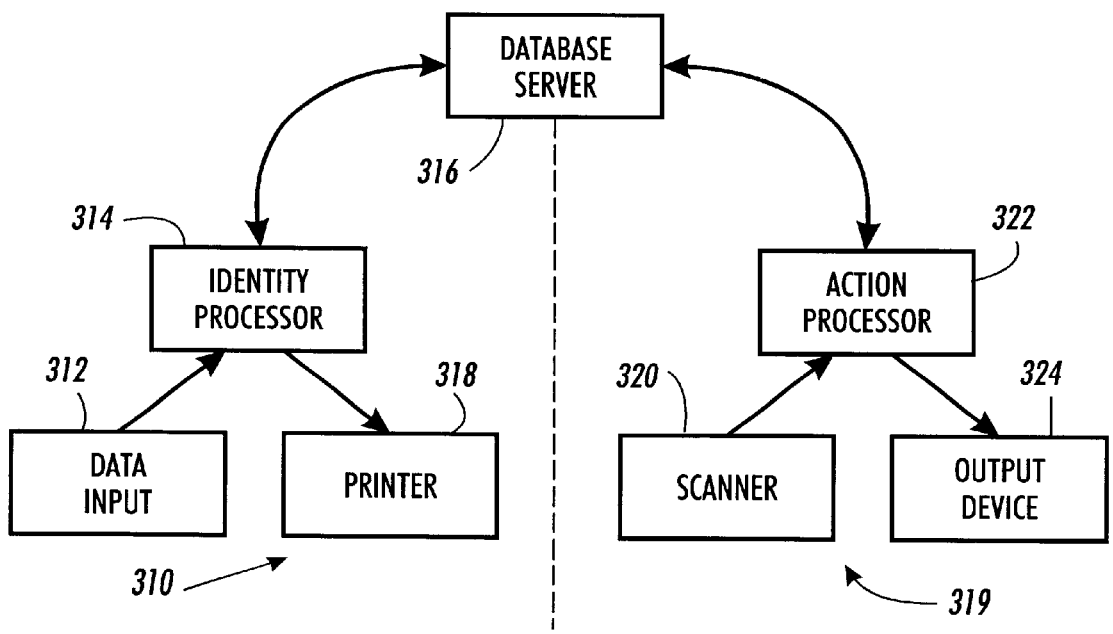
FIG. 3 is a system-level block diagram.

FIG. 3 represents a system-level overview of the invention, broken down into several high-level functional elements. A "front end" portion 310 receives information from a data input 312. The data input 312 may comprise a keyboard, a business card scanner, a voice recognition device, or any other means of data collection operative to receive data representative of the user's identity. The data input 312 may be expected to receive the user's name, company, title, address, one or several telephone numbers, one or several e-mail addresses, as well as other possible identification information (such as a U.S. Social Security number or a conference ID number). This user information is then received by an identity processor 314, which stores the information as a record in a database hosted by a database server 316. Concurrently, the user information is processed by the identity processor 314 to produce the identity code 216 (incorporating the identity and security information discussed above). The identity code 216 and any desired optional service code 212 and service argument 214 are then encoded and printed on a printer 318 or other hardcopy output device in communication with the identity processor 314.

When the user wishes to process a document, he attaches a glyph sticker according the invention onto the document and places the document into a scanner 320, which is part of a "back end" 319 of the system. The scanner is preferably an automated scanner capable of handling multiple jobs and multi-page documents without user intervention. However, any other type of digitizing apparatus (such as flatbed scanners, digital copiers, and hand-held scanners) would also be usable in this application. The scanner 320 reads the document and formulates a bitmap representative of the document (and the glyph sticker on the document).

An action processor 322 reads the bitmap received from the scanner 320, identifies and decodes the glyph sticker, and accesses the database server 316 to determine the identity of the user. The desired service may be known from accessing a list of possible services stored locally on the action processor 322, or may also be determined by accessing a service database on the database server 316, or alternatively may be inferred simply from the identity of the user.

Based on the user's identity and the desired service, the action processor 322 then causes the desired action to be performed, which may involve the generation of a transformed document by an output device 324. The output device 324 is characterized generally here, but as discussed above, may comprise a hardcopy printer, a facsimile machine (or modem capable of sending fax messages), a network connection for e-mail, a connection to a document repository, a digital storage device (such as a floppy disk drive), or an aggregation of some or all of these and other functions.

While the system of FIG. 3 is illustrated as being broken down into several functional blocks, it should be noted that the functions depicted can be performed on a single computer system or by several computer systems connected via a communications network. As a specific example, the database server 316 may be local to the identity processor 314 and the action processor 322, or it may be a separate processor in communication with the other elements via a communications network, such as the Internet or a corporate intranet.

Figure 4:
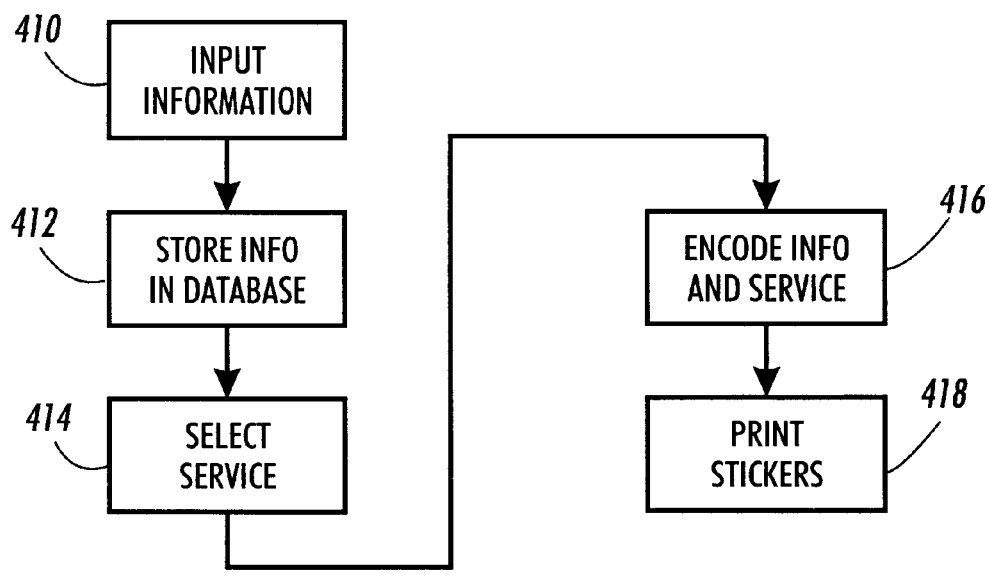
FIG. 4 is a high-level functional flow chart of the sticker creation function of the invention.

As suggested above by FIG. 3, the front end processing of the system, namely the creation of glyph sticker patterns 110 based on user information and a desired service, takes place as a sequence of steps. These steps are shown in the flow chart of FIG. 4.

First, the user (or another person) inputs information (step 410) into the system, typically via the data input 312 (FIG. 3). All of the information is then stored in the database (step 412) on the database server 316. A service is then selected (step 414). The service may be chosen from a "menu" of possible services, or in one embodiment of the invention, only a single service may be operative. In the latter case, the service code 212 and the service argument 214 (FIG. 2) may optionally be omitted from the glyph sticker pattern 110.

The user identity code 216, the service code 212, and the service argument 214 are then encoded and formed into a glyph field 112 representative of the information (step 416). The newly-created customized glyph field 112 is then printed any number of times as glyph sticker patterns 110 onto any desired number of stickers (step 418) for eventual use by the user.

Figure 5:
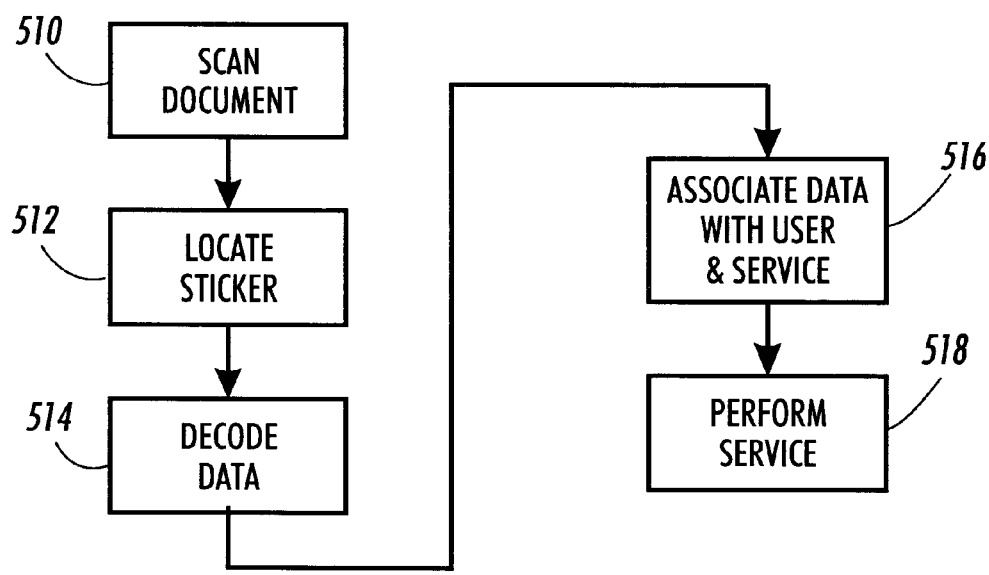
FIG. 5 is a high-level functional flow chart of the sticker processing function of the invention.

FIG. 5 is a flow chart illustrating what happens after the user has applied a sticker to a document and presented it for scanning. First, the document is scanned (step 510) and the resulting bitmap is retained for processing. The original hardcopy document may, at this time, be returned to the user, as it is no longer needed by the system of the invention.

The glyph sticker pattern 110 is then located on the document (step 512). In a preferred embodiment of the invention, the glyph sticker pattern is located via a rectangle-matching method described below in conjunction with FIG. 6. In an alternative embodiment of the invention, the user is directed to place the glyph sticker at a certain location on the document (e.g., the upper right corner of the first page), thereby simplifying the operations required to locate the glyph sticker pattern 110. In another alternative embodiment, the sticker pattern 110 can be identified anywhere on a document by segmenting the scanned document bitmap into text and graphics portions, and in the line-graphics portions, locating the right-angled lines that comprise the border of the glyph sticker pattern 110. A method for accomplishing this is set forth in detail in U.S. Pat. No. 5,202,933 to Bloomberg, entitled "SEGMENTATION OF TEXT AND GRAPHICS," which is hereby incorporated by reference as though set forth in full. To facilitate this, half-tones and finely textured graphics regions (such as lithographed photographs) may also be segmented out (and away from the line graphics) via the methods taught in U.S. Pat. Nos. 5,065,437 and 5,131,049. It should be noted that the glyph sticker pattern 110 may be present in nearly any orientation; accordingly, the segmentation method should be adapted to check several different orientations (by using differently-shaped structuring elements in the morphological operations used in the incorporated '933 patent document to identify horizontal and vertical lines) before it is determined that no sticker is present. Finally, a Hausdorff-distance-based algorithm may also be used; it should be noted that this method, like the morphological method referenced above, is rotationally sensitive and hence relatively computationally inefficient.

Once the glyph sticker pattern 110 has been located, the data within the glyph field 112 is then decoded (step 514). This is accomplished via methods that will be discussed in further detail below, in connection with FIGS. 7–14. The data is then associated (step 516) with user identification information (received from the database server 316) and a desired service, and the service is performed (step 518) be means known in the art and discussed above.

Figure 6:
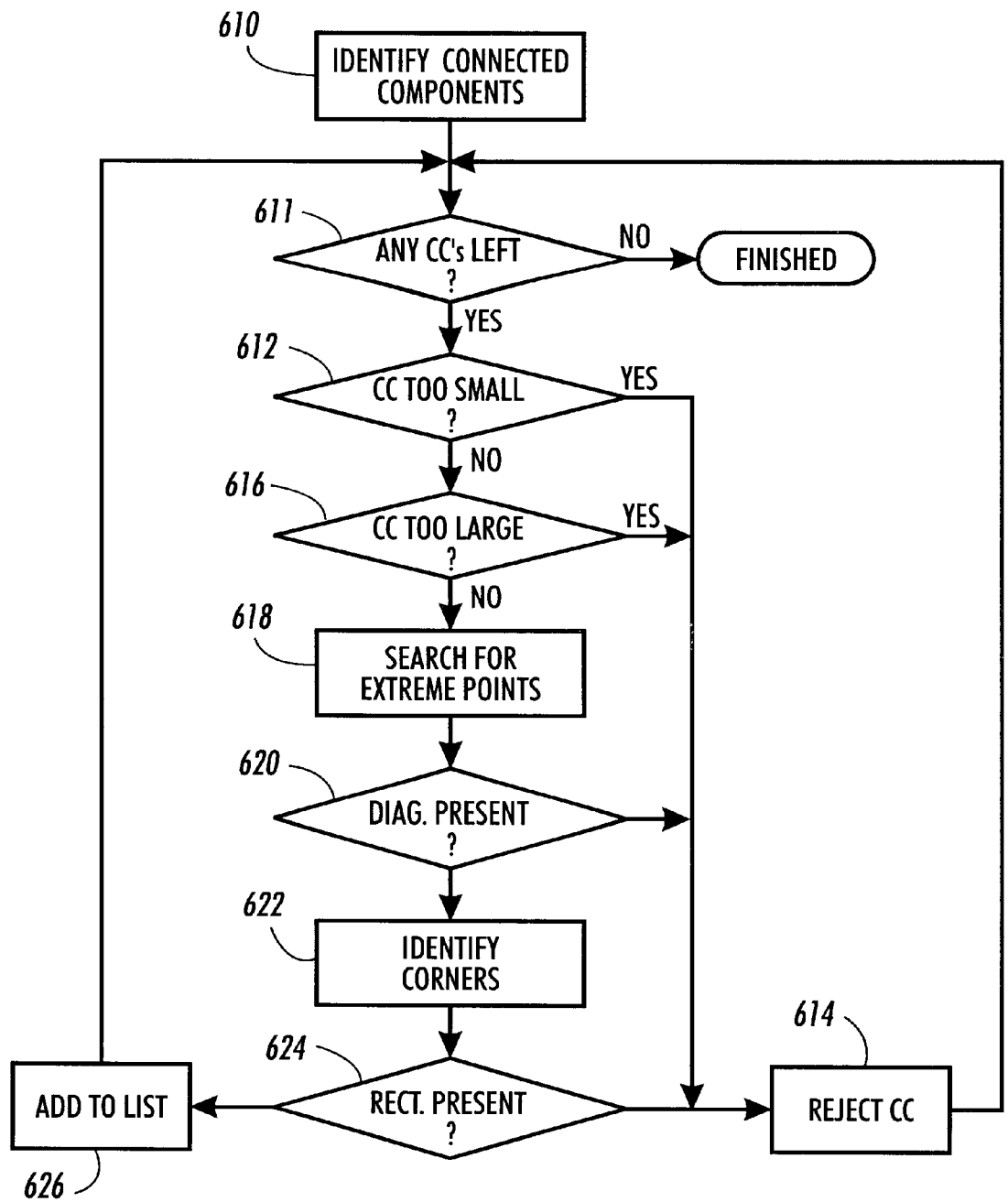
FIG. 6 is a flow chart illustrating the sequence of steps performed in locating the sticker as set forth in FIG. 5.

A presently preferred method used to locate user interface tags (e.g., the glyph sticker pattern 110 of FIG. 1) within a digitized image is illustrated in FIG. 6. This method can be used to identify and locate objects that are approximately rectangular in shape, such as the iconic representation of a page with one corner folded over, as used as the glyph sticker pattern 110 in an embodiment of the invention (see FIG. 1). Such rectangular objects can be characterized by a height dimension and a width dimension. The identification method can identify the desired pattern in any orientation and with relatively small scale variations (such as those occurring in the printing and digitizing processes), even when image noise is present.

The method is operative on monochromatic images (i.e., binary images represented with only one bit per pixel). If the digitized image is in some other format (such as color or grayscale), it should first, as a precursor to the method set forth in FIG. 6, be converted to a binary format, typically via a threshold function or by dithering.

The characteristics (e.g., resolution) of the digitizing device used are expected to be known. Therefore, because the absolute size of the glyph sticker pattern 110 (FIG. 1) is known, its image size can be calculated. Accordingly, the expected width w and the expected height h of the pattern 110, in pixels, is either known or can be easily calculated. With width and height tolerances ($\Delta w$ and $\Delta h$, respectively) to account for minor variations in scale, as stated above, a minimum expected width would be $w_{min}=(w-\Delta w)$, a maximum expected width would be $w_{max}=(w+\Delta w)$, a minimum expected height would be $h_{min}=(h-\Delta h)$, and a maximum expected height would be $h_{max}=(h+\Delta h)$. In a presently preferred embodiment, $\Delta h=(0.1)h$ and $\Delta w=(0.1)w$; stated another way, the tolerances are 10% of the respective height and width. It should be noted, however, that other tolerances ranges may also be operative, and that different tolerances may be used for the width and height dimensions.

Accordingly, and based on the foregoing, the minimum and maximum expected diagonal measurements would be $d_{min}=\sqrt{(w-\Delta w)^2+(h-\Delta h)^2}$ and $d_{max}=\sqrt{(w+\Delta w)^2+(h+\Delta h)^2}$, respectively.

After a suitable digitized image is available, all connected components within the image are initially identified (step 610). A connected component is a set of pixels of a single value (e.g., the value representing black), wherein it is possible to form a path from any pixel of the set to any other pixel in the set without leaving the set (e.g., by traversing only black pixels). In general terms, a connected component may be either "4-connected" or "8-connected." In the 4-connected case, the path can move in only horizontal or vertical directions, so there are four possible directions. Accordingly, two diagonally adjacent black pixels are not 4-connected, unless there is another black pixel horizontally or vertically adjacent, serving as a bridge between the two. In the 8-connected case, the path between pixels may also proceed diagonally. A presently preferred embodiment of the invention uses 8-connected components, but it is contemplated that 4-connected components may also be identified and used.

Because the border 111 of the glyph sticker pattern 110 (FIG. 1) is formed from single group of contiguous black pixels, it should be observed that the border 111 comprises a single connected component. In a preferred embodiment of the invention, the white space 113 around the border 111 is sufficiently wide to ensure that the border 111 is not inadvertently connected with some other portion of the hardcopy document to which the glyph sticker pattern 110 is applied. Moreover, the border 111 is also sufficiently thick to ensure that it is not inadvertently broken into discrete components by image noise.

The connected components within the image are identified by means known in the art (i.e., by starting with a single black pixel within the image, recursively locating all connected pixels until the connected component is fully defined, and repeating until all black pixels within the image belong to a connected component). However, other means of identifying connected components may also be used to equivalent effect.

Each connected component is then processed separately. If there are any connected components remaining to process (step 611), then the method continues as follows. If the connected component is too small (step 612), that is, if its width or height is less than a minimum expected value, then the connected component is rejected (step 614). In an embodiment of the invention, the minimum expected value, used for both height and width, is the smaller of $h_{min}$ and $w_{min}$ to account for possible rotation of the pattern 110. Likewise, the connected component is rejected (step 614) if it is too large (step 616), and its width or height exceeds the maximum expected value by a substantial amount. In an embodiment of the invention, the maximum expected value, for both height and width, is substantially larger than the greater of $h_{max}$ and $w_{max}$ to account for possible rotation.

When the pattern 110 (or any rectangle) is oriented at an angle, its width and height may appear to be larger than expected, approaching or equaling $d_{max}$. Accordingly, a buffer is built into the latter check.

Eight extreme points, one for each of eight "compass positions," are then selected (step 618) from the set of pixels comprising the connected component C. Each point has a position represented by an (x, y) coordinate pair, and represents a pixel of the connected component C that extends furthest in the selected direction (north, northeast, east, southeast, south, southwest, west, or northwest) within the image plane. Each extreme point is chosen as follows.

$$N=(x_N, y_N) \in C | y_N \leq y \forall (x, y) \in C$$

$$E=(x_E, y_E) \in C | x_E \geq x \forall (x, y) \in C$$

$$S=(x_S, y_S) \in C | y_S \geq y \forall (x, y) \in C$$

$$W=(x_W, y_W) \in C | x_W \leq x \forall (x, y) \in C$$

$$NE=(x_{NE}, y_{NE}) \in C | (x_{NE} - y_{NE}) \geq (x-y) \forall (x, y) \in C$$

$$SE=(x_{SE}, y_{SE}) \in C | (x_{SE} + y_{SE}) \geq (x+y) \forall (x, y) \in C$$

$$SW=(x_{SW}, y_{SW}) \in C | (x_{SW} - y_{SW}) \leq (x-y) \forall (x, y) \in C$$

$$NW=(x_{NW}, y_{NW}) \in C | (x_{NW} + y_{NW}) \leq (x+y) \forall (x, y) \in C$$

It should be noted that various optimizations can be performed in identifying the eight extreme points. For example, if the connected component C is broken down into horizontal runs of contiguous pixels, then only the leftmost pixel in each run need be considered as a candidate for the NW, W, and SW extreme points, and only the rightmost pixel in each run need be considered as a candidate for the NE, E, and SE extreme points. Moreover, if the horizontal runs are ordered vertically, then only the endpoints of the uppermost and lowermost runs need be considered for the N and S extreme points. It should further be noted that, when the border 111 (FIG. 1) is oriented precisely at any 45° interval from upright, then there may be many pixels within the connected component that satisfy one or more of the criteria for extremeness set forth above. This is not a problem; any satisfactory pixel may be chosen. For example, there is no single south-most pixel in the border 111 of FIG. 1, so any pixel along the bottom edge may be chosen. Moreover, it is not a problem for a single pixel to be used as multiple extreme points. Referring again to FIG. 1, for example, a bottom-right corner pixel 122 may be used as the S, SE, and E extreme points without any impact on the described method.

If the connected component C is the border 111 (namely, a rectangle with one missing corner), then three of the extreme points will contain rectangular corner points (the folded-over corner will be offset), and the other five will contain irrelevant information. However, the method described herein has not yet determined whether the connected component C is the border 111, or if so, which extreme points represent its corners; that is determined as set forth below.

Consider, then, all eight extreme points. If the distance between any two diametrically opposed extreme points satisfies the diagonal length criteria (step 620), then the connected component is a border candidate. That is, if $d_{min} \leq \|N\text{-}S\| \leq d_{max}$, or if $d_{min} \leq \|E\text{-}W\| \leq d_{max}$, or if $d_{min} \leq \|NE\text{-}SW\| \leq d_{max}$, or if $d_{min} \leq \|SE\text{-}NW\| \leq d_{max}$, then a border candidate has been found. Otherwise, the connected component C is rejected (step 614).

Based on the position of the diagonal, the other two potential corners of the connected component are then identified (step 622) and considered. If the diagonal was found between either the N–S or E–W extremities, then the values of N, E, S, and W are used for $p_1$, $p_2$, $p_3$, and $p_4$, representing the four corner points of the border candidate, respectively. Similarly, if the diagonal was found between either the NE-SW or SE-NW extremities, then the values of NE, SE, SW, and NW are used for $p_1$, $p_2$, $p_3$, and $p_4$, the four corner points of the border candidate, respectively.

Then, relationships among the four points $p_1$, $p_2$, $p_3$, and $p_4$ are analyzed to determine whether a rectangular shape is present (step 624). In particular, the distances between $p_1$ and $p_2$, $p_2$ and $p_3$, $p_3$ and $p_4$, and $p_4$ and $p_1$ are all considered. At least one distance (of the four possible) should approximate the expected width, and at least one adjacent (but not the opposing) distance should approximate the expected height.

That is, if either $$((w_{min} \leq \|p_1 - p_2\| \leq w_{max}) \text{ or } (w_{min} \leq \|p_3 - p_4\| \leq w_{max})) \text{ and}$$

$$((h_{min} \leq \|p_2 - p_3\| \leq h_{max}) \text{ or } (h_{min} \leq \|p_4 - p_1\| \leq h_{max}))$$

or $$((h_{min} \leq \|p_1 - p_2\| \leq h_{max}) \text{ or } (h_{min} \leq \|p_3 - p_4\| \leq h_{max})) \text{ and}$$

$$((w_{min} \leq \|p_2 - p_3\| \leq w_{max}) \text{ or } (w_{min} \leq \|p_4 - p_1\| \leq w_{max}))$$

is true, then the connected component C is potentially the border 111, and it is added to a list (step 626) of possible positions. If not, the connected component C is, once again, rejected (step 614).

As stated above, a list of potential positions is generated from all border candidates that satisfy the foregoing criteria. The entire list is then passed to the decode process (step 514 of FIG. 5). Presumably, only one border candidate will contain valid glyph (or other) data. If more than one border candidate includes valid data, then the first one found is used.

It should be noted that the foregoing method of identifying and locating the substantially rectangular border 111 of the glyph sticker pattern 110, in any orientation and with minor variations in scale, would be applicable to and useful in numerous other image-processing applications. It is contemplated that the method illustrated in FIG. 6 and described in detail above may be used to identify and locate nearly any substantially rectangular pattern within a digitized image, either as a part of or separately from the other features and capabilities described herein.

Furthermore, it will be appreciated that minor variations of this method, readily apparent to those skilled in the art, may also be used to identify and locate various parallelogram, rhombus, trapezoid, and irregular quadrilateral patterns in addition to rectangles and rectangle-like shapes. In these alternative embodiments, either one or both of the diagonals can be checked; the two diagonals may have different expected lengths. In addition, the method can be extended to identify and locate n-sided polygons, by identifying extreme points at 2n evenly-spaced compass positions, and thereafter checking for vertices at alternating extreme points. Where n is an odd number, it should be noted that any diagonal found will not be diametric; however any expected distance (or set of expected distances) between adjacent or non-adjacent vertices, in nearly any n-sided polygon, can be used in a method according to the invention to identify the polygon within an image.

Figure 7:
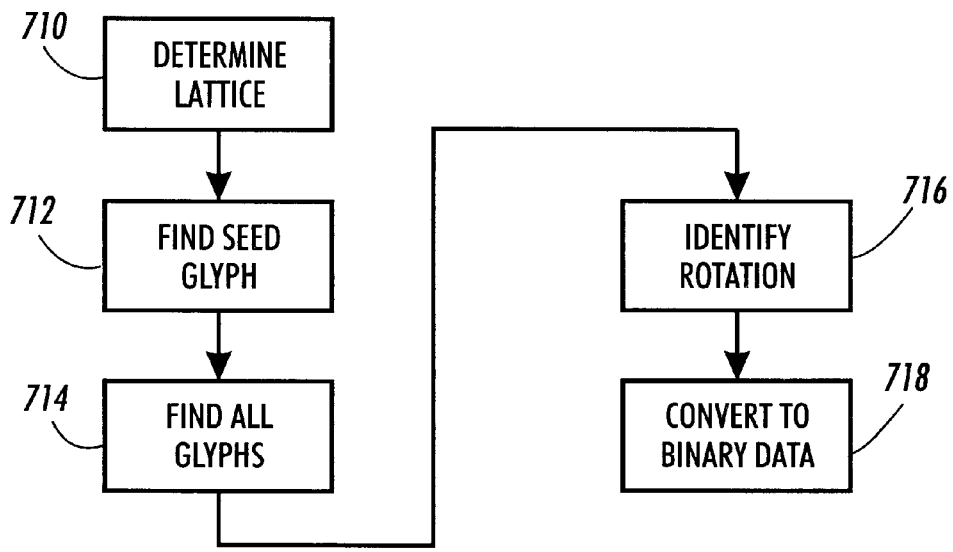
FIG. 7 is a flow chart illustrating the sequence of steps performed in decoding the sticker as set forth in FIG. 5.

FIG. 7 illustrates the sequence of steps performed in recognizing a glyph field 112 (FIG. 1) and translating it into binary data. First, the glyph lattice is determined (step 710).

Figure 8:
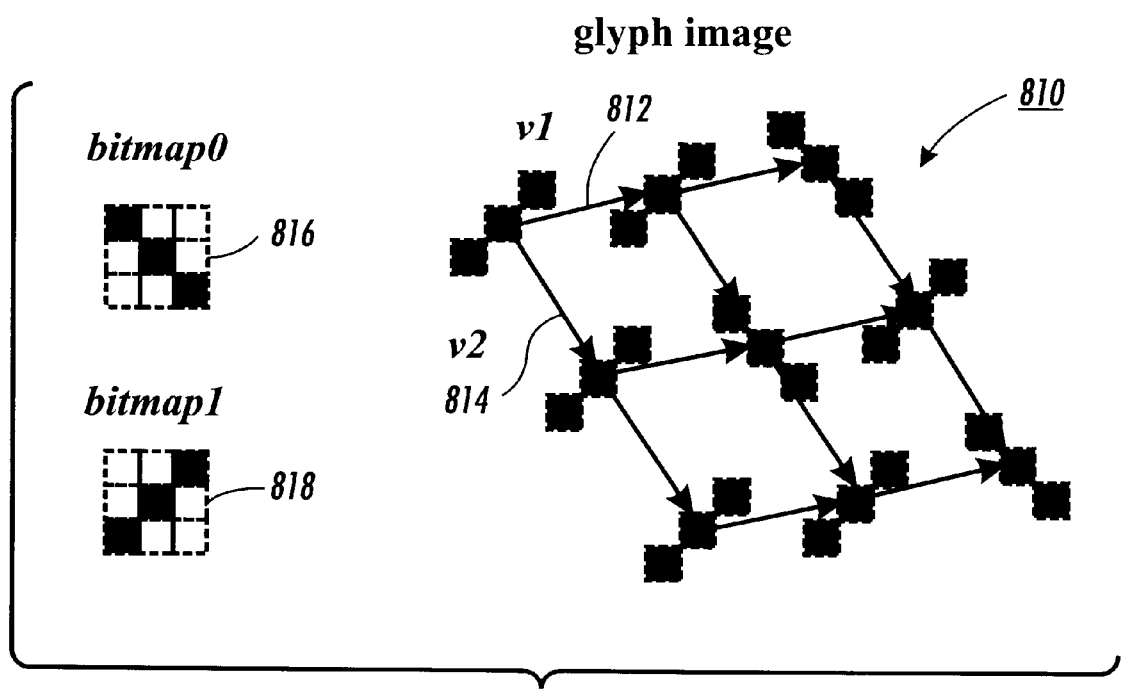
FIG. 8 illustrates a portion of an exemplary glyph lattice with associated glyph bitmaps and lattice vectors.
Figure 9:
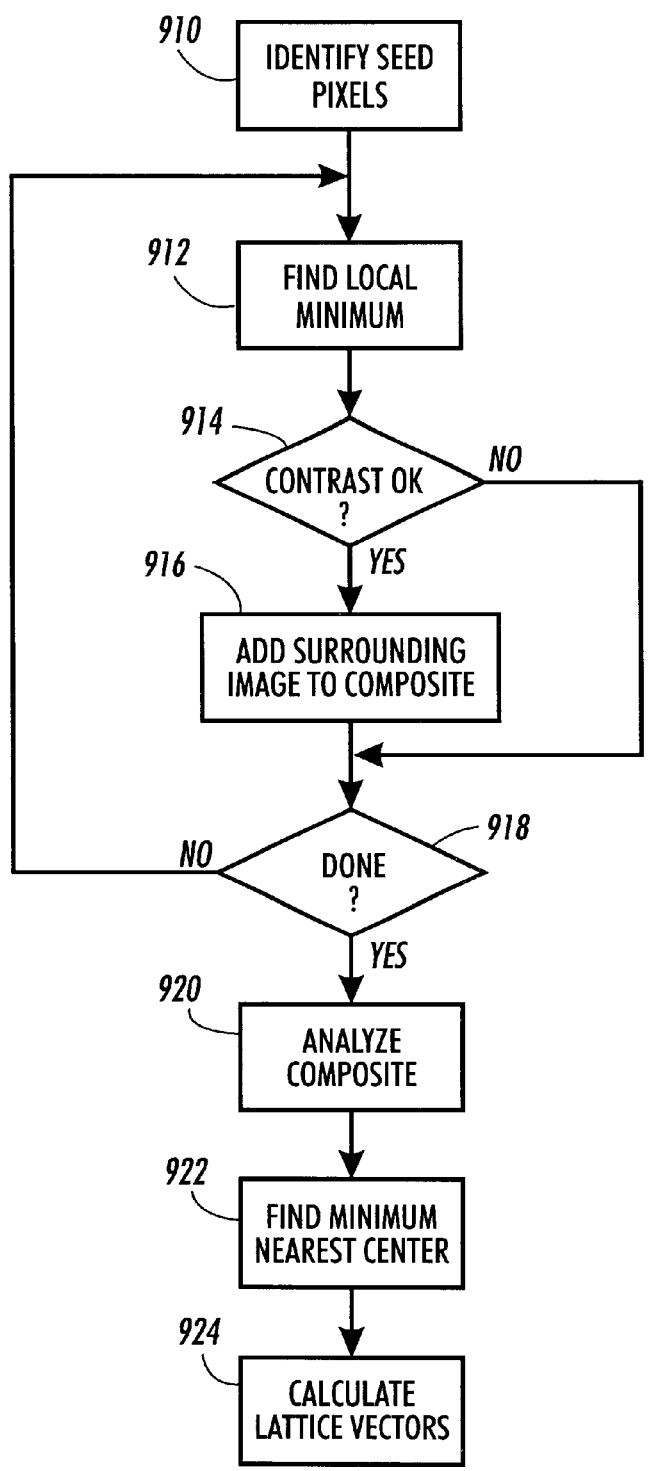
FIG. 9 is a flow chart illustrating the sequence of steps performed by the invention in determining the glyph lattice as shown in FIG. 7.
Figure 10:
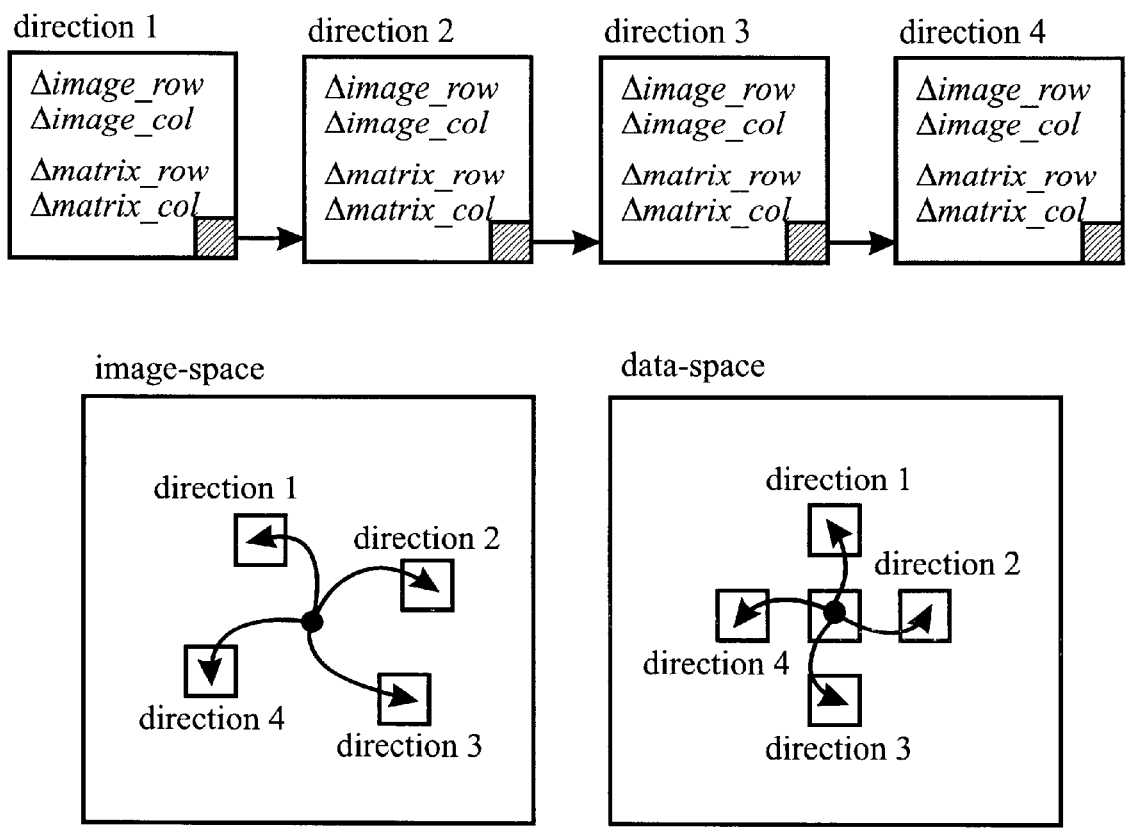
FIG. 10 is a schematic diagram illustrating the search directions employed in searching for glyphs as shown in FIG. 7.
Figure 11:
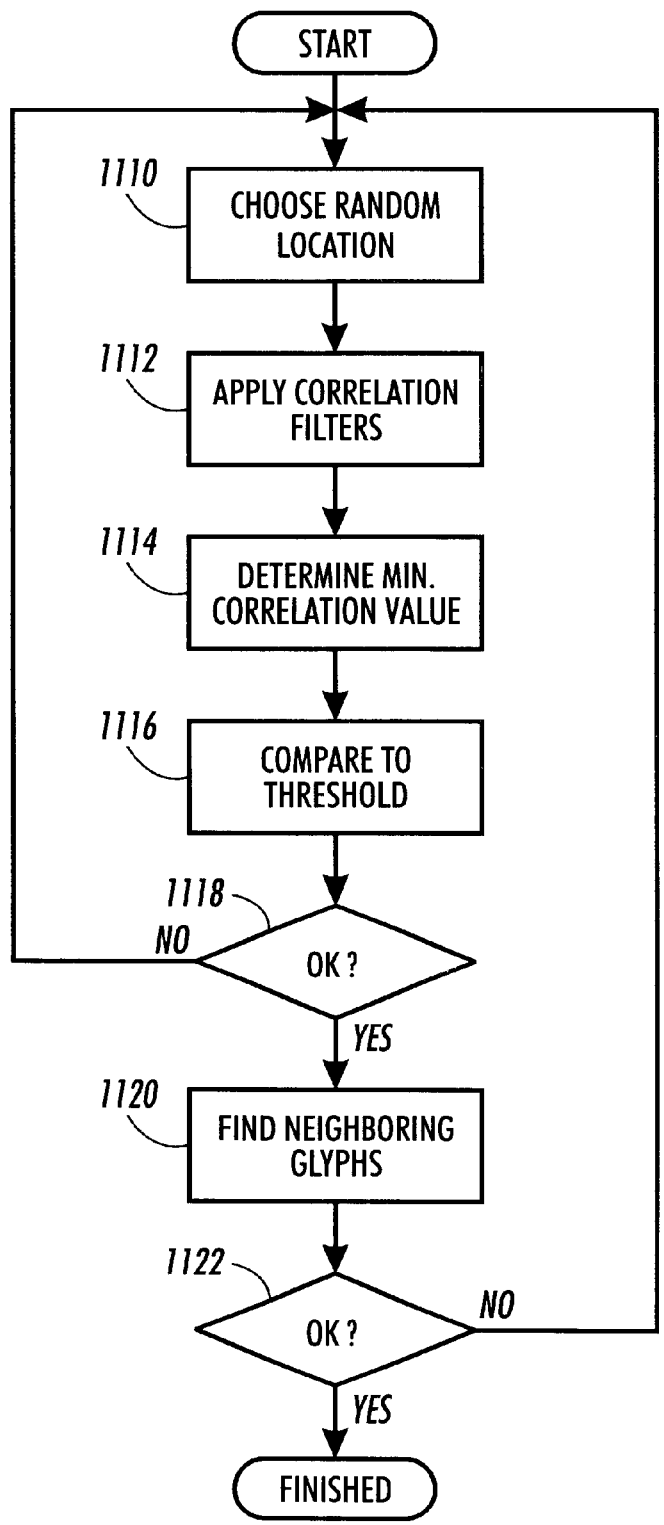
FIG. 11 is a flow chart illustrating the sequence of steps performed in finding a seed glyph as in FIG. 7.
Figure 12:
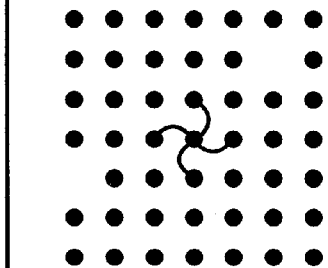
FIG. 12 is a schematic diagram illustrating the procedure used to find all glyphs as in FIG. 7.
Figure 12:
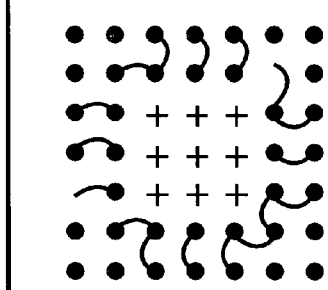
Figure 13:
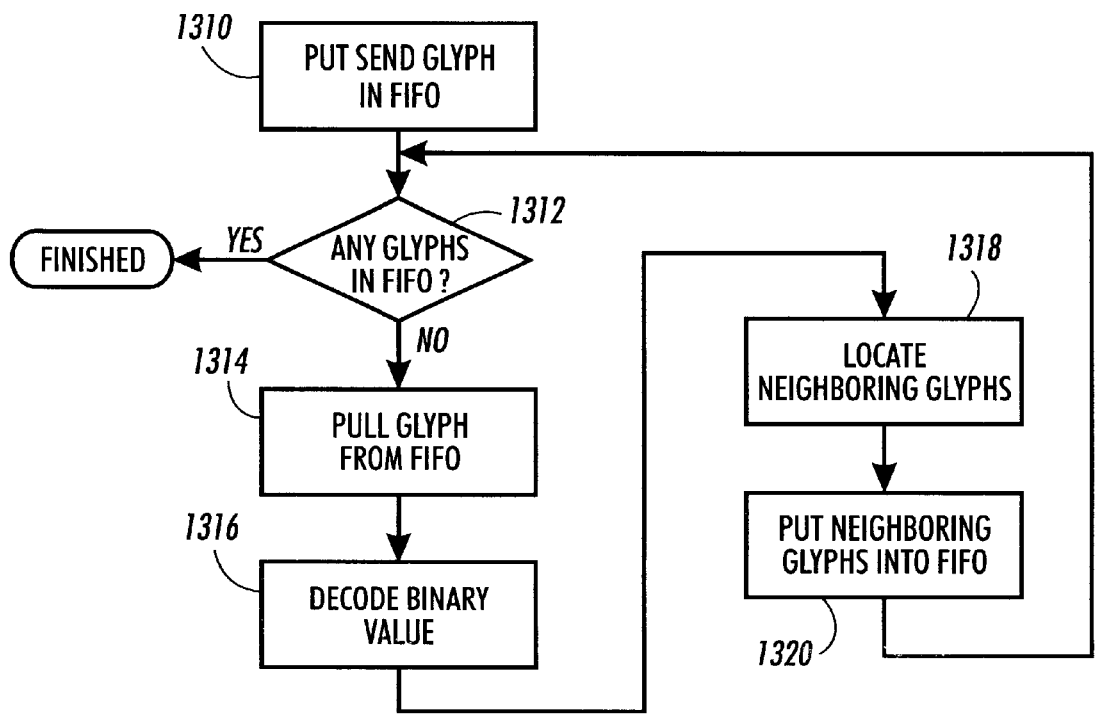
FIG. 13 is a flow chart illustrating the sequence of steps performed in finding all glyphs near the seed glyph as shown in FIG. 7.
Figure 14:
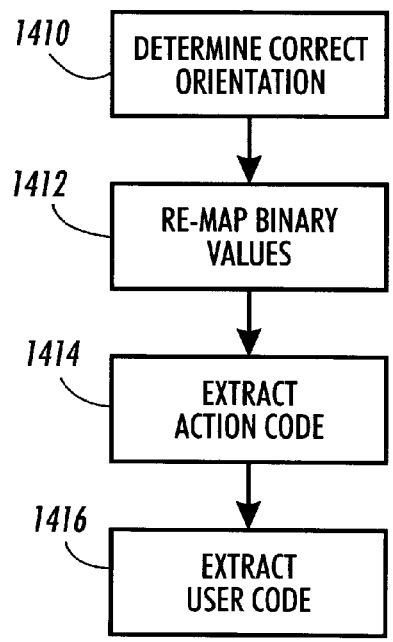
FIG. 14 is a flow chart illustrating the steps performed in decoding a glyph pattern according to the invention.

Essentially, glyph lattice vectors (FIG. 8) along with skew and scale information need to be determined; this operation is illustrated in FIG. 9 and described in further detail below. Second, a seed glyph is found (step 712). The recognition process begins by finding a single "good" glyph, the seed glyph; see FIG. 11. Third, all of the glyphs are found (step 714) by recursively examining the seed glyph's neighbors (as shown in FIGS. 12–13). The lattice vectors direct the search and help perform the mapping from image space to a matrix of glyph values. As will be shown below, these steps can all be performed regardless of the glyph field's rotation.

Once all of the glyphs have been located, the proper rotation of the glyph field 112 is determined (step 716). As can be seen in FIG. 1, the preferred glyph configuration comprises "slash" patterns at +45° and −45° orientations. Accordingly, the glyph field 112 may appear to be valid at orientations of 0°, 90°, 180°, and 270°. Therefore, the binary patterns represented by the glyph field 112 are processed to determine the correct rotation. In one embodiment of the invention, a synchronization pattern is embedded into the glyph field 112; this pattern will only be reconstructed correctly when the field 112 is in the correct orientation. For a method of disambiguating the glyph field orientation, see the specification and drawings of U.S. Pat. No. 5,449,895 to Hecht and Stearns, entitled "EXPLICIT SYNCHRONIZATION FOR SELF-CLOCKING GLYPH CODES," which is hereby incorporated by reference as though set forth in full herein. In particular, see columns 15–16 of the '895 patent for a detailed description of rotational disambiguation. It should be noted that the position of the corner 120 (FIG. 1) may also be used in an alternative embodiment of the invention to determine the correct orientation of the glyph field 112.

As shown in FIG. 8, a glyph image 810 can be defined by two lattice translation vectors 812 and 814 and two (or more) bitmaps 816 and 818 that specify the information that is to be represented at each lattice site. This definition is analogous to defining a crystal in solid-state physics. This method of specifying the glyph image allows for a wide variety of structures, but it also provides a scheme for handling arbitrary rotations, scales, lattices, and bitmaps. For instance, rotation of the glyph image 810 simply corresponds to a rotation of the translation lattice vectors 812 and 814. Just as translation vectors would define the displacement from glyph center to glyph center during construction of the glyph image, the translation vectors also define the displacement from glyph center to glyph center during the recognition process. Viewing the glyph image as a lattice allows the recognition scheme to handle a wide variety of glyph formatting schemes while handling rotation and scale variations.

The method for determining the glyph lattice is based upon building up an average picture of what the local neighborhood of the glyph is, and from this average, determining the lattice vectors. In a preferred embodiment of the invention, this is implemented as follows (and as illustrated in FIG. 9).

In the glyph image (that is, the area within the border 111), identify some number of pixels in the image as seed pixels for processing (step 910). These seed pixels may be, for example, spaced on a lattice of N×N pixels throughout the image, where N is of the order of 10–50 (the spacing may be chosen so that there are approximately 100 seed pixels throughout the glyph image 810).

Then, starting at each seed pixel, find the local minimum intensity in the image nearest that seed (step 912). If no local minimum is found within an appropriate distance of the seed pixel (e.g. 10 pixels), then move to the next seed pixel. The local minima, i.e. the darkest points in the bitmap, typically correspond to glyphs.

Once a local minimum is found, it is determined whether there is sufficient image contrast (step 914) between the region within 1 to 2 pixels of the minimum (i.e., the center), and the region 3 to 4 pixels from the minimum (i.e., the surrounding area). If the contrast is too small compared to the average image intensity surrounding the local minimum, then the method abandons further computation with the present local minimum, and moves to the next seed pixel in the glyph image (if there are any). This step, which may be left out if desired, is employed to screen out spurious local minima in the image resulting from noise and other non-glyph material.

Otherwise, the grayscale image surrounding the local minimum is added (step 916) to a composite image, which initially is filled with pixels of value zero. This composite image, which is built up during the processing, thus becomes a sum of the bitmap values around a number of local minima in the glyph image. The composite image is typically on the order of 20×20 pixels in dimension.

If there are any seed pixels remaining to be processed (step 918), then the process is repeated.

After finding the local minima associated with all of the seed pixels, the composite image is analyzed (step 920) to determine the average glyph locations. For example, the center of the composite image will necessarily be a local minimum, as it is composed of many images whose centers were minima. The nearest local minima to the center in the composite image will then correspond to the average nearest neighbor positions of the glyphs in the glyph lattice. Determination of these minima in the composite image will therefore result in knowledge of the configuration of the glyph lattice; the lattice vectors 812 and 814 can then be derived.

The method described above and in conjunction with FIG. 9 is very robust, due to the averaging properties of building up the composite image. As in any signal averaging procedure, it is expected that in the composite image, pixels corresponding to the locations of glyphs will sum coherently, while image noise will not. In practice, it has been found that the average glyph lattice parameters of an image may be obtained robustly using the above procedure, even when a large number (>50%) of the glyphs are obscured or eradicated by image noise or overwriting. In addition, the above procedure works under any amount of image skew.

From the glyphs' lattice vectors 812 and 814, a search direction list 1010 is generated. See FIG. 10. The search direction list is a list of corresponding relative displacements in image space 1012 and data space 1014 for finding neighboring glyphs. From a known glyph in image space, the search direction list 1010 provides information on where the neighboring glyphs should be located. And for each translation in image space (1016, 1018, 1020, and 1022), there is a corresponding relative displacement in data space (1024, 1026, 1028, and 1030). Accordingly, for a known lattice structure, rotation, and scale, the relative movements in image space can be specified without changing the corresponding movement in data space. This method of defining the search allows the process to accommodate a wide variety of glyph lattices, rotations, and scales. It should be noted that the search direction list is also extendable to search for second-nearest-neighbor glyphs, or non-rectilinear search patterns.

The operations performed in finding a seed glyph for the recognition process will be discussed in connection with FIG. 11. Finding a good seed glyph is critical. If the seed glyph is actually a spurious center, the process will quickly fail. Preferably, the process looks for a seed glyph that has at least four neighboring glyphs. This gives some assurance that the chosen seed is not spurious.

The seed glyph is found by looking at random locations in the images. At a chosen random location (step 1110), a set of correlation filters is applied over a 3×3 neighborhood of pixels adapted to cover the area of a single glyph (step 1112). The 3×3 neighborhood accommodates noise and small variations in the glyph lattice. The correlation filters that are applied depend upon the image skew determined from finding the lattice vectors 812 and 814. If the skew is between −22.5° and 22.5°, the following correlation filter kernels are applied:

$$K_0 = \begin{bmatrix} 1 & 0 & 0 \\ 0 & 1 & 0 \\ 0 & 0 & 1 \end{bmatrix}; K_1 = \begin{bmatrix} 0 & 0 & 1 \\ 0 & 1 & 0 \\ 1 & 0 & 0 \end{bmatrix}$$

If the skew is between −45° and −22.5°, the following kernels are applied:

$$K_0 = \begin{bmatrix} 0 & 0 & 0 \\ 1 & 1 & 1 \\ 0 & 0 & 0 \end{bmatrix}; K_1 = \begin{bmatrix} 0 & 1 & 0 \\ 0 & 1 & 0 \\ 0 & 1 & 0 \end{bmatrix}$$

If the skew is between 45° and 22.5°, the following kernels are applied:

$$K_0 = \begin{bmatrix} 0 & 1 & 0 \\ 0 & 1 & 0 \\ 0 & 1 & 0 \end{bmatrix}; K_1 = \begin{bmatrix} 0 & 0 & 0 \\ 1 & 1 & 1 \\ 0 & 0 & 0 \end{bmatrix}$$

The two correlation kernels are applied separately over the 3×3 neighborhood where a glyph is expected. Since the glyphs typically appear black, the minimum value of the two correlations is observed, and the difference between the two correlations is formed (step 1114) and compared to a threshold (step 1116):

$$v = \min(K_0 * I_{3\times3}) - \min(K_1 * I_{3\times3})$$

where * denotes correlation. If the absolute value of v is less than a preset threshold (step 1118), the location does not contain a glyph. If v is positive, the glyph has a value of 0, and if v is negative, the glyph has a value of 1.

Once a glyph is found, the method looks for neighboring glyphs (step 1120) using the search direction list described above. The method stops looking for a seed glyph once it has found a glyph with four neighboring glyphs (step 1122).

The final step in the recognition process is to determine the values of the individual glyphs and place these values into a matrix. The invention uses the search direction list (FIG. 10) to find new glyphs and to properly map their values into a matrix. The process, which is shown in FIG. 13, begins at the seed glyph. The seed glyph is placed into a dynamic data matrix and the location of the glyph in image space and data space are placed onto a search FIFO (first-in-first-out) list (step 1310).

The search FIFO list controls the clustering. As new glyphs are found, they are placed at the end of the search FIFO list. Essentially, the search FIFO list contains the locations in the image that need to be searched for neighboring glyphs. When the search FIFO list is empty, the process stops.

Beginning with the seed glyph, if any glyphs are present in the FIFO list (step 1312), the method pulls a glyph location from the FIFO list (step 1314). Its value is determined (step 1316) and placed into the data matrix. The value of the glyph is determined by using the same correlation kernels used to find the seed glyph. The method then searches outward (step 1318) looking for neighboring glyphs using the search direction list (see FIG. 12(*a*)); neighboring glyphs are placed into the FIFO list (step 1320). The method generates a cluster of known glyphs that grows outward as it searches for new glyphs around the perimeter of the cluster (FIG. 12(*b*)). The outcome of the procedure is a data matrix full of data values 1210 (FIG. 12(*c*)) representative of the glyph image 810.

This method has several desirable features. First, it can handle groups of glyphs with arbitrary boundaries. The glyph block need not be rectangular. Second, it provides a clean method of dealing with scale and rotation variations. Finally, it is tolerant to intensity gradients and markings placed on top of the glyphs. It should be noted that although a FIFO list is used in the presently preferred embodiment of the invention, other search methods, including those that use a LIFO (last-in-first-out) stack or a list based on some other ordering scheme, such as position within the image, can also be used with similar effect.

Finally, as discussed above, the data matrix is used as shown in FIG. 14. First, the data matrix is rotationally disambiguated as described above (step 1410). The binary values in the data matrix are re-mapped accordingly (step 1412), which may involve re-ordering the matrix and inverting the data values, as necessary based on the rotation. The service code is extracted from the resulting data (step 1414), as is the user code (step 1416), and the invention handles the service as discussed above in conjunction with FIG. 3.

While certain exemplary embodiments of the invention have been described in detail above, it should be recognized that other forms, alternatives, modifications, versions and variations of the invention are equally operative and would be apparent to those skilled in the art. The disclosure is not intended to limit the invention to any particular embodiment, and is intended to embrace all such forms, alternatives, modifications, versions and variations.

What is claimed is:

1. A method for locating a substantially rectangular pattern in a digitized image, the pattern having an expected diagonal length, comprising the steps of:

receiving data representative of the digitized image;

identifying a connected component in the image;

finding a plurality of extreme points within the connected component;

determining whether the expected diagonal length is present between two of the plurality of extreme points;

if so, locating corners of a pattern candidate; and determining whether a correctly-dimensioned substantially rectangular shape is defined by the corners.

2. The method of claim 1, wherein the pattern has an expected width and an expected height.

3. The method of claim 2, further comprising the steps, after identifying a connected component, of:

determining whether the connected component is substantially narrower or shorter than the smaller of the expected width and the expected height, and if so, rejecting the connected component; and determining whether the connected component is substantially taller or wider than the greater of the expected width and the expected height, and if so, rejecting the connected component.

4. The method of claim 2, further comprising the steps, after identifying a connected component, of:
determining whether the connected component is substantially narrower or shorter than the smaller of the expected width and the expected height, and if so, rejecting the connected component; and
determining whether the connected component is substantially taller or wider than the expected diagonal length, and if so, rejecting the connected component.

5. The method of claim 2, wherein the finding step comprises identifying eight extreme points in positions corresponding to compass positions representing north, northeast, east, southeast, south, southwest, west, and northwest.

6. The method of claim 5, wherein the extreme points comprise four opposing pairs of extreme points.

7. The method of claim 6, wherein the step of determining whether the expected diagonal length is present comprises:
calculating the distance between each opposing pair of extreme points;
if the distance is substantially equal to the expected diagonal length, indicating that the expected diagonal length is present.

8. The method of claim 5, wherein the step of locating corners comprises the step of selecting a first corner point, a second corner point, a third corner point, and a fourth corner point from the eight extreme points such that the two points defining the expected diagonal length but no two adjacent compass positions are included in the corner points.

9. The method of claim 8, wherein the step of determining whether a correctly-dimensioned substantially rectangular shape is defined comprises the steps of:
determining whether either a distance from the first corner point to the second corner point or a distance from the third corner point to the fourth corner point is substantially equal to the expected width, and whether either a distance from the second corner point to the third corner point or a distance from the fourth corner point to the first corner point is substantially equal to the expected height, and if both width and height criteria are satisfied, indicating that a correctly-dimensioned substantially rectangular shape is defined by the four corner points; and
determining whether either a distance from the first corner point to the second corner point or a distance from the third corner point to the fourth corner point is substantially equal to the expected height, and whether either a distance from the second corner point to the third corner point or a distance from the fourth corner point to the first corner point is substantially equal to the expected width, and if both height and width criteria are satisfied, indicating that a correctly-dimensioned substantially rectangular shape is defined by the four corner points.

10. The method of claim 1, further comprising the step of repeating the identifying, finding, determining, locating, and determining steps until all connected components in the image have been processed.

11. A system for locating a substantially rectangular pattern in a digitized image, the pattern having an expected diagonal length, the system comprising:
image receiving means for receiving data representative of the digitized image;
shape detection means coupled to said image receiving means, said shape detection means comprising:
symbol identification means for identifying a connected component in the image;
extreme point identification means of finding a plurality of extreme points within the connected component;
extreme point diagonal measurement means for determining whether the expected diagonal length is present between two of the plurality of extreme points;
corner points identification means for identifying corners of a pattern candidate having the expected diagonal length between tow of the plurality of extreme points; and
rectangle detection means for determining whether a substantially rectangular shape is defined by the corners.

12. The system of claim 11 wherein the pattern has an expected width and an expected height and the system further comprises:
means for determining whether the connected component is substantially narrower or shorter than the smaller of the expected width and the expected height, and if so, rejecting the connected component; and
means for determining whether the connected component is substantially taller or wider than the greater of the expected width and the expected height, and if so, rejecting the connected component.

13. The system of claim 11 further comprises means for determining whether the connected component is substantially taller or wider than the expected diagonal length, and if so, rejecting the connected component.

14. The system of claim 11, wherein the extreme point identification means further comprises means for identifying eight extreme points in positions corresponding to compass positions representing north, northeast, east, southeast, south, southwest, west, and northwest.

15. The system of claim 11 wherein the extreme points comprise four opposing pairs of extreme points and the extreme point diagonal measurement means further comprises means further comprises:
means for calculating the distance between each opposing pair of extreme points;
means for determining if the distance is substantially equal to the expected diagonal length and if it is, indicating that the expected diagonal length is present.

16. The system of claim 11, wherein the corner points identification means further comprises means for selecting a first corner point, a second corner point, a third corner point, and a fourth corner point from the eight extreme points such that the two points defining the expected diagonal length but no two adjacent compass positions are included in the corner points.

17. The system of claim 16, wherein the extreme point diagonal measurement means further comprises:
means for determining whether either a distance from the first corner point to the second corner point or a distance from the third corner point to the fourth corner point is substantially equal to the expected width, and whether either a distance from the second corner point to the third corner point or a distance from the fourth corner point to the first corner point is substantially equal to the expected height, and if both width and height criteria are satisfied, and indicating that a correctly-dimensioned substantially rectangular shape is defined by the four corner points; and means for determining whether either a distance from the first corner point to the second corner point or a distance from the third corner point to the fourth corner point is substantially equal to the expected height, and whether either a distance from the second corner point to the third corner point or a distance from the fourth corner point to the first corner point is substantially equal to the expected width, and if both height and width criteria are satisfied, and indicating that a correctly-dimensioned substantially rectangular shape is defined by the four corner points.

18. A method for finding a polygon in an image, said polygon having at least one expected diagonal length, said method comprising the steps of:

receiving data representative of the digitized image;

identifying a connected component in the image;

finding a plurality of extreme points within the connected component;

determining whether the at least one expected diagonal length is present between two of the plurality of extreme points;

if so, locating corners of a pattern candidate; and determining whether a correctly-dimensioned polygon is defined by the corners.

19. The method as recited in claim 18 wherein said polygon has at least two expected diagonal lengths and said determining step determines whether the at least two expected diagonal lengths are present between two different sets of the plurality of extreme points.

20. The method as recited in claim 18 wherein said polygon has n sides and said step of finding a plurality of extreme points within the connected component is comprised of finding 2n evenly spaced compass positions on said connected component.

* * * * *